(12) United States Patent
Burkell et al.

(10) Patent No.: US 11,750,014 B2
(45) Date of Patent: Sep. 5, 2023

(54) BATTERY CONTROL SYSTEM (71) Applicant: Transportation IP Holdings, LLC, Norwalk, CT (US)

(72) Inventors: Neil Burkell, Erie, PA (US); Jacob Pressman, Erie, PA (US); Ajith Kuttannair Kumar, Erie, PA (US); Bret Worden, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/507,145

(22) Filed: Oct. 21, 2021

(65) Prior Publication Data
US 2023/0010942 A1    Jan. 12, 2023

Related U.S. Application Data

(60) Provisional application No. 63/220,255, filed on Jul. 9, 2021.

(51) Int. Cl.
*H02J 7/00* (2006.01)
*B60L 58/12* (2019.01)
*B60L 1/14* (2006.01)

(52) U.S. Cl.
CPC .......... *H02J 7/00714* (2020.01); *B60L 1/14* (2013.01); *B60L 58/12* (2019.02); *H02J 7/007* (2013.01); *H02J 7/0013* (2013.01); *H02J 7/0048* (2020.01); *H02J 7/0063* (2013.01); *H02J 7/007182* (2020.01); *B60L 2240/12* (2013.01)

(58) Field of Classification Search
CPC .... H02J 7/00714; H02J 7/0013; H02J 7/0048; H02J 7/0063; H02J 7/007182; B60L 1/14; B60L 58/12; B60L 2240/12
See application file for complete search history.

(56) References Cited

U.S. PATENT DOCUMENTS

| 2005/0077879 A1* | 4/2005 | Near | H02J 7/0018 320/166 |
| 2010/0327807 A1* | 12/2010 | Kikinis | H02J 7/0016 320/116 |
| 2016/0134160 A1 | 5/2016 | Schultz et al. | |

(Continued)

OTHER PUBLICATIONS

Search Report dated Dec. 16, 2022 for corresponding European Application No. 221829328 (10 pages).

*Primary Examiner* — Lincoln D Donovan
*Assistant Examiner* — Alex W Lam
(74) *Attorney, Agent, or Firm* — The Small Patent Law Firm LLC; Christopher R. Carroll (57) ABSTRACT

A battery control system and method selectively connect battery strings to one or more conductive buses by plural electrically controllable switches. The switches are controlled to one or more of (a) connect the strings with one or more of the load or the power source via the one or more conductive buses in a first sequence and/or (b) disconnect the strings from one or more of the load or the power source via the one or more conductive buses in a second sequence. The first sequence and the second sequence are based on one or more of states of charge between the strings, different charge capacities between the strings, different electric currents conducted through the strings, different polarities of the electric currents conducted through the strings, and/or a speed of a vehicle that is powered by the one or more loads.

18 Claims, 7 Drawing Sheets

(56) References Cited

U.S. PATENT DOCUMENTS

| | | | |
|---|---|---|---|
| 2016/0187431 A1* | 6/2016 | Yamamoto | H01M 10/425 |
| | | | 324/426 |
| 2017/0166065 A1 | 6/2017 | Hong et al. | |
| 2017/0166075 A1 | 6/2017 | Hong et al. | |
| 2018/0375348 A1* | 12/2018 | Weyen | G01R 31/52 |
| 2020/0274368 A1 | 8/2020 | Crouse, Jr. | |
| 2020/0319259 A1 | 10/2020 | Pressman et al. | |

\* cited by examiner

BATTERY CONTROL SYSTEM

CROSS-REFERENCE TO RELATED APPLICATIONS

This application claims priority to U.S. Provisional Application No. 63/220,255 (filed 9 Jul. 2021), the entire disclosure of which is incorporated herein by reference.

BACKGROUND

Technical Field

The subject matter described herein relates to control of battery systems to prolong the useful lives of the battery systems.

Discussion of Art

A variety of powered systems may use electric energy stored in batteries to power one or more components of a powered system and/or the entirety of the powered system. These battery systems may be designed on a variety of inputs that drive designs that can include building blocks of battery cells in parallel and/or series and groups of cells connected in parallel and/or series to attain a desired amount of energy, voltage, packaging requirements of the designs, etc.

But the increasing complexity of the battery systems can increase the wear and tear on battery cells. For example, closing switches (e.g., contactors) to connect battery cells having different amounts of energy stored in the cells (e.g., different voltages of the cells) can increase inrush currents to and/or from strings of the cells. These currents can damage the switches and/or cells over time. Therefore, a need exists for a system and method that controls how and when strings of battery cells are connected and/or disconnected relative to each other to extend the useful life of the switches and/or cells.

BRIEF DESCRIPTION

In one example, a system (e.g., a battery control system) includes plural strings of energy storage devices that may power a load and to be charged by a power source. The strings are selectively connectable to one or more conductive buses by plural electrically controllable switches. The system also includes a controller operatively connected to the switches and that may control the switches for one or more of (a) connecting the strings with one or more of the load or the power source via the one or more conductive buses in a first sequence or (b) disconnecting the strings from one or more of the load or the power source via the one or more conductive buses in a second sequence. The first sequence and the second sequence are based on one or more of states of charge between the strings, different charge capacities between the strings, different electric currents conducted through the strings, different polarities of the electric currents conducted through the strings, and/or a speed of a vehicle that is powered by the one or more loads.

In one example, a system (e.g., another battery control system) includes strings of energy storage devices that may power loads and to be charged by one or more power sources of a vehicle. The strings are selectively connectable to a conductive bus by plural electrically controllable switches. The system also includes a controller operatively connected to the switches and that may control the switches for one or more of connecting the strings to the bus or disconnecting the strings from the bus in a sequence that is based on one or more of states of charge between the strings, charge capacities of the strings, electric currents conducted into or out of the strings, polarities of the electric currents conducted into or out of the strings, or a speed of the vehicle.

In one example, a method includes determining one or more of states of charges of strings of energy storage devices, charge capacities of the strings, electric currents conducted into or out of the strings, or polarities of the electric currents; comparing the one or more of the states of charges, the charge capacities, the electric currents, or the polarities; and one or more of closing or opening switches between the strings and a conductive bus that couples the strings with a load and a power source of a powered system. The switches are one or more of closed or opened in a sequence based on the states of charges, the charge capacities, the electric currents, or the polarities that are compared.

BRIEF DESCRIPTION OF THE DRAWINGS

The inventive subject matter may be understood from reading the following description of non-limiting examples, with reference to the attached drawings, wherein below.

DETAILED DESCRIPTION

Examples of the subject matter described herein relate to systems and methods that control how and when different energy storage devices (e.g., battery cells or strings of battery cells) are connected or disconnected from a conductive bus to extend the useful lives of the cells and/or strings of the cells, as well as the switches that connect or disconnect the strings to the conductive bus. In one example, the strings that are connected or disconnected in the sequences described herein can be in parallel to each other. Alternatively, at least two of the strings may be disposed in series with each other.

As described herein, a battery cell can refer to an electrochemical cell that is a device capable of generating electric energy from chemical reactions and/or storing electric energy for later use. A cell group can refer to two or more battery cells connected in parallel to each other. A cell stack can refer to two or more cell groups that are connected in series with each other. A pack can refer to two or more cell stacks connected in series with each other, and which optionally can be disposed in a packaging or housing. A string can refer to two or more packs connected in series with each other.

Figure 1A:
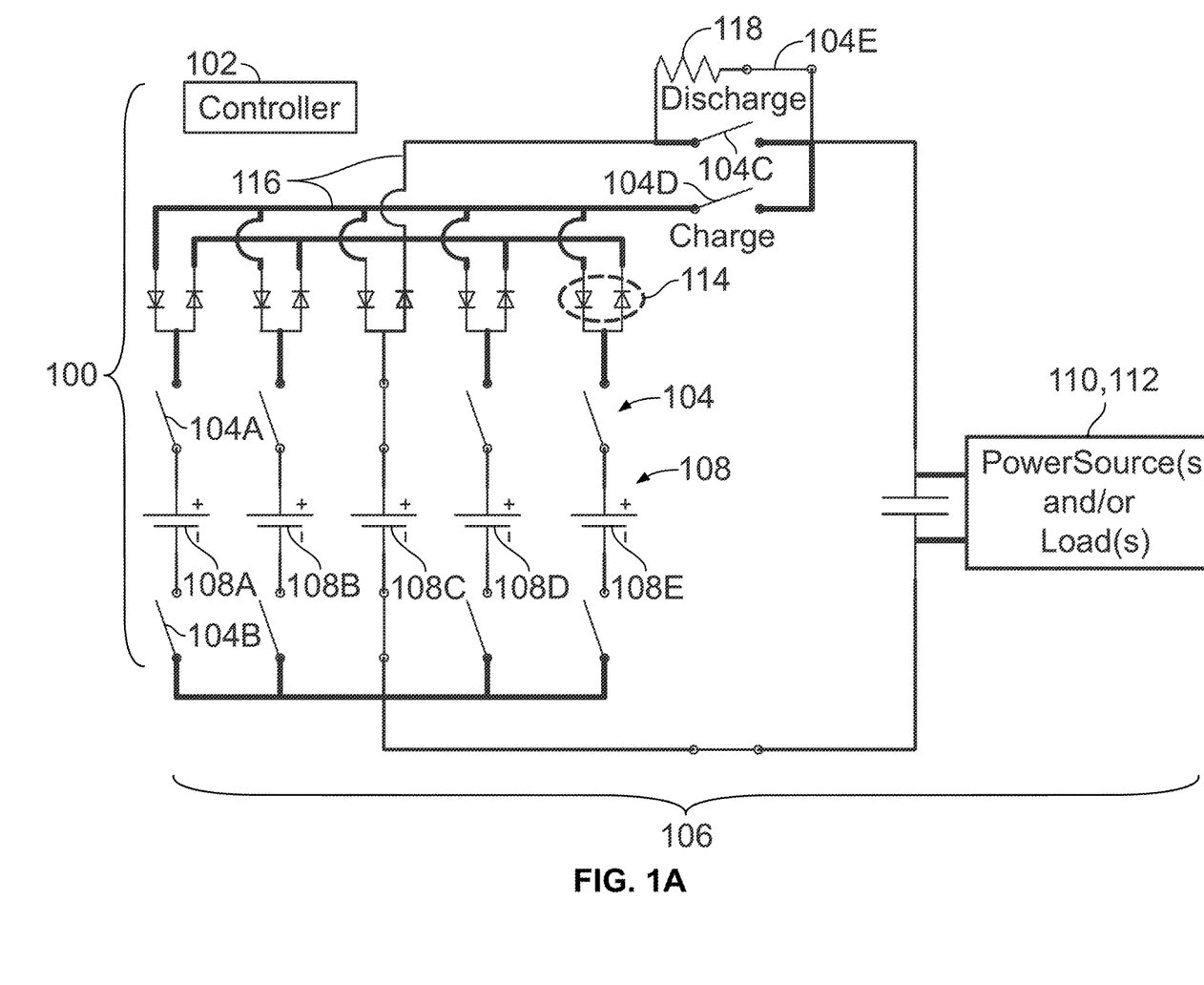
FIGS. 1A and 1B illustrate examples of a battery control system.
Figure 1B:
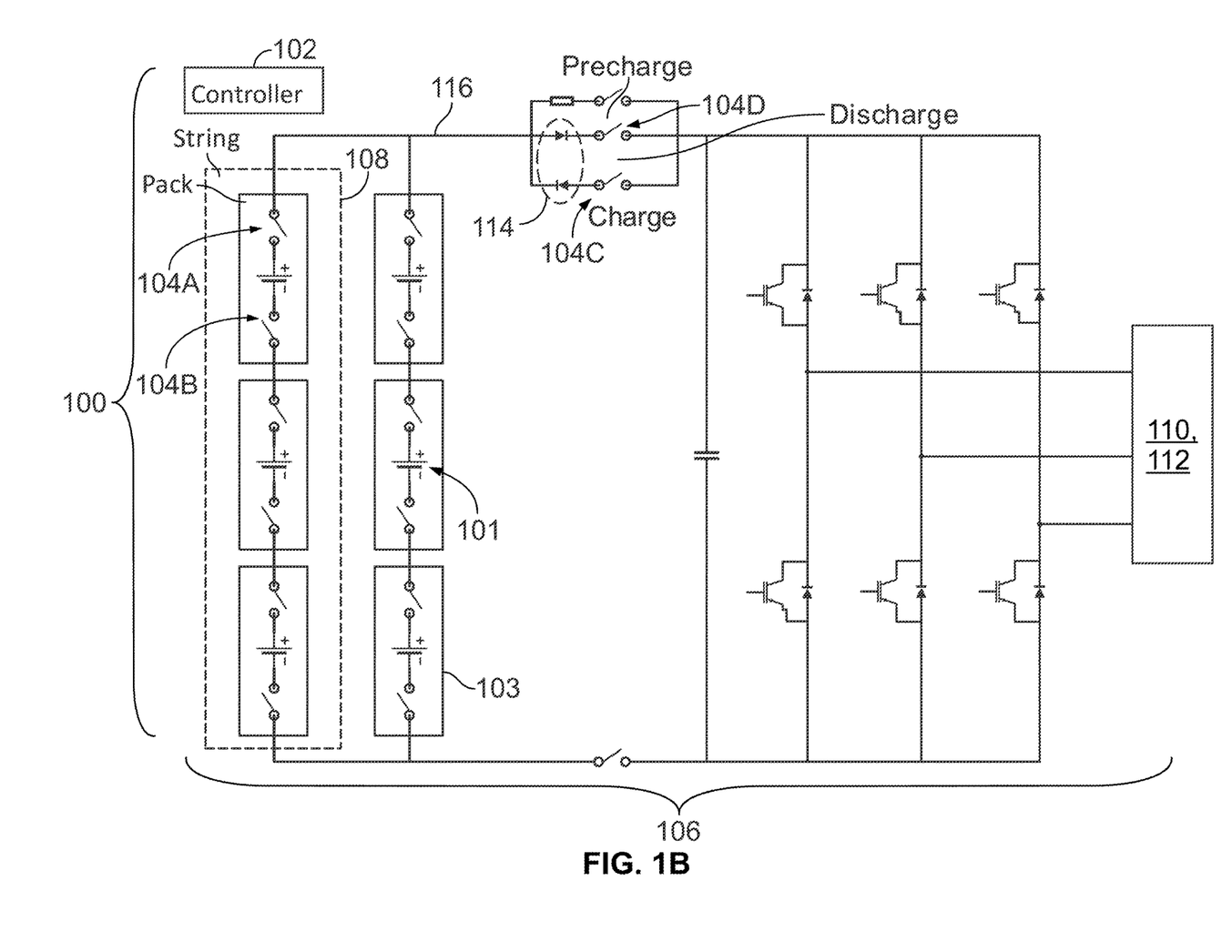
Figure 2:
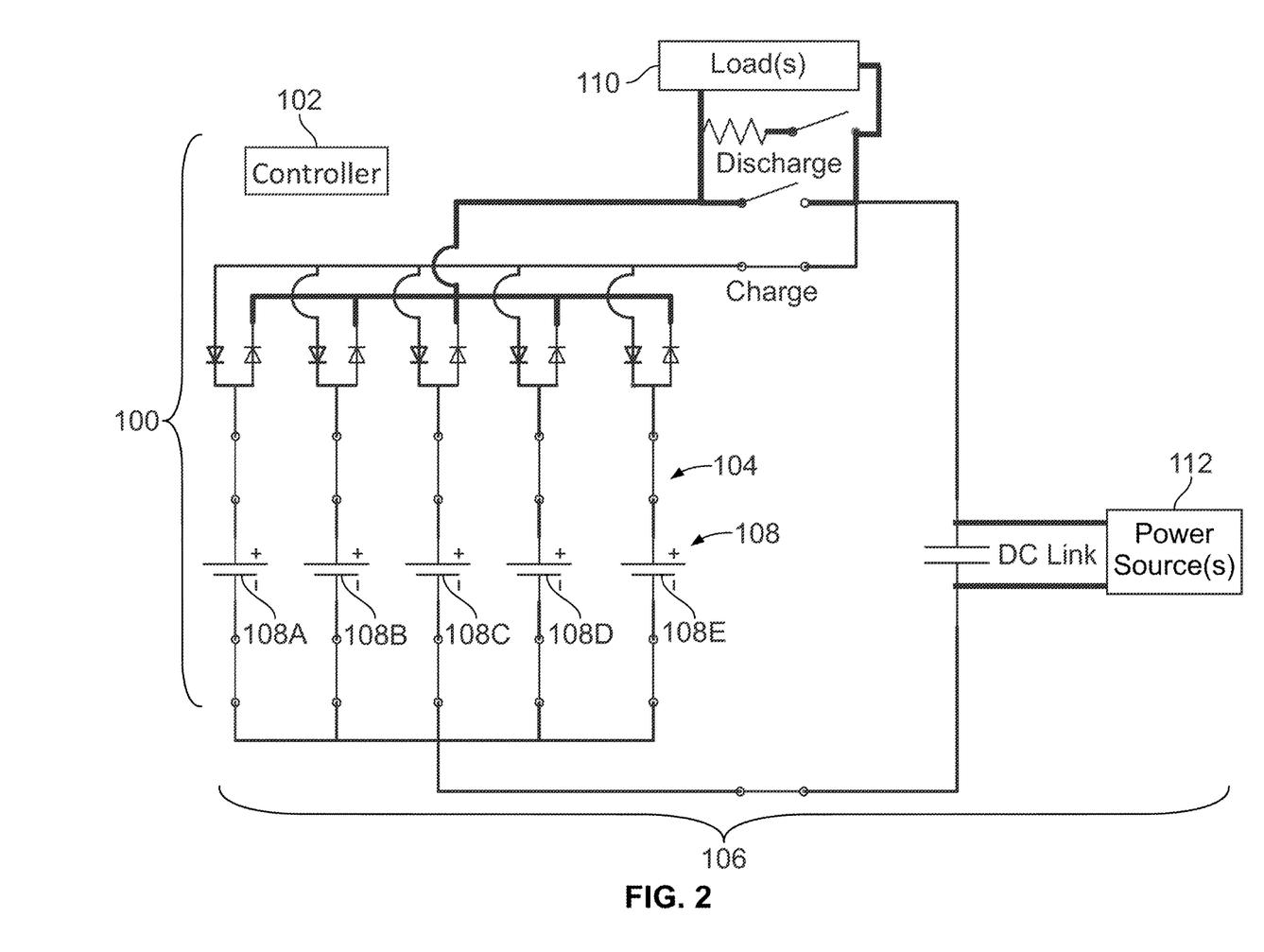
FIG. 2 illustrates another example of the control system shown in FIG. 1A in a charging state.
Figure 3:
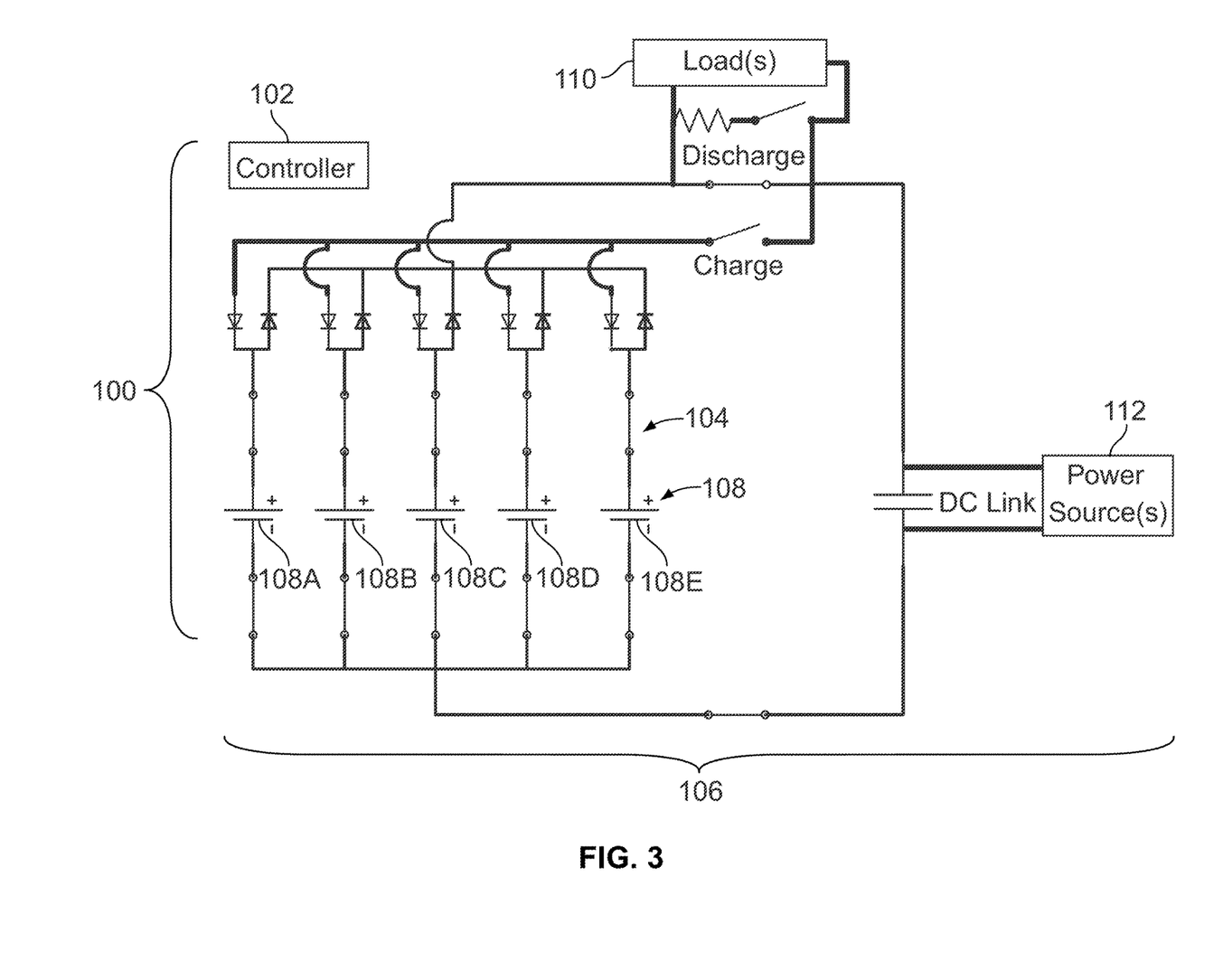
FIG. 3 illustrates another example of the control system shown in FIG. 1A in a discharging state.
Figure 4:
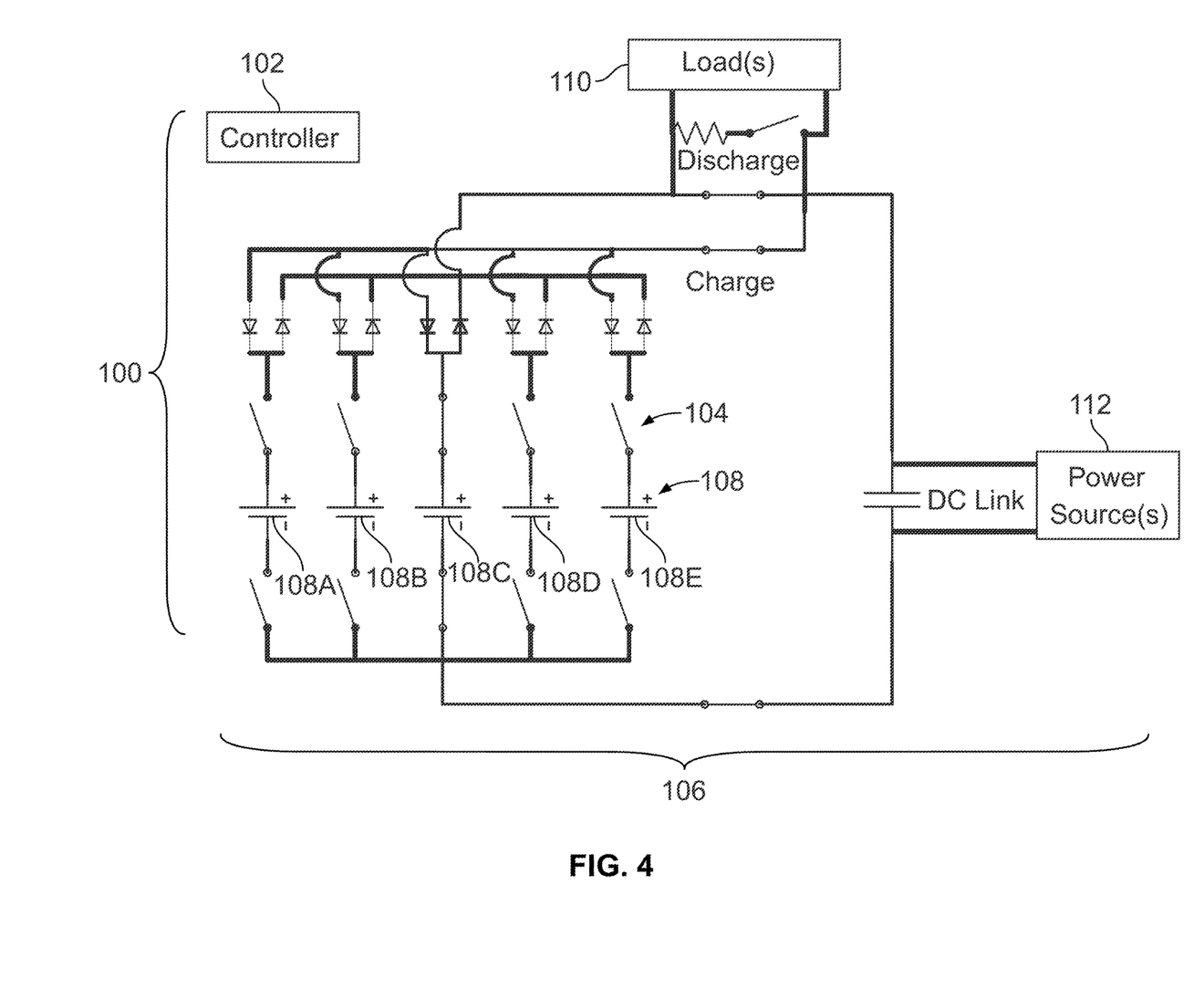
FIG. 4 illustrates another example of the control system shown in FIG. 1A in a diodes shorted state.

FIGS. 1A and 1B illustrate examples of a battery control system 100. FIG. 2 illustrates another example of the control system shown in FIG. 1A in a charging state. FIG. 3 illustrates another example of the control system shown in FIG. 1A in a discharging state. FIG. 4 illustrates another example of the control system shown in FIG. 1A in a diodes shorted state.

The control system includes a controller 102 that operates to control several electrically controllable switches 104 in a powered system 106. The number and/or arrangement of the components of the powered system shown in FIGS. 1 through 4 are provided merely as one example. Additional or fewer components may be provided, and/or the components may be in a different arrangement than what is shown.

The controller can represent hardware circuitry that includes and/or is connected with one or more processors (e.g., one or more integrated circuits, one or more field programmable gate arrays, one or more microprocessors, etc.) that operate to send signals via conductive pathways (e.g., wires, cables, conductive buses, conductive traces, etc.) and/or to send the signals wirelessly to the switches to control which switches are open, which switches are closed, and when switches are opened or closed. The controller can automatically generate these signals and/or can generate the signals based on input (e.g., from an operator and/or the powered system).

The powered system can represent a stationary or mobile system that is at least partially powered by electric energy stored in battery cells or battery packs within battery strings 108 (e.g., strings 108A-E) in the powered system. For example, all of the energy demand of the powered system may be provided by the battery strings or less than all of the energy demand of the powered system may be provided by the battery strings. The powered system can be a vehicle, such as a mining vehicle, rail vehicle, automobile, truck, bus, marine vessel, agricultural vehicle, or the like. The powered system can include one or more loads 110 that are partially or entirely powered by the energy stored in the battery strings. These loads can represent motors, lamps, processors, or the like. The powered system can include one or more power sources 112 that generate electric energy to charge the battery cells, such as one or more motors that generate energy via regenerative braking of the powered system, an alternator or generator coupled with an engine, a charger or other connection (e.g., to a wayside device or utility grid), etc.

The strings includes switches on both sides of the strings (FIG. 1A) or on both sides of battery cells 101 in battery packs 103 in the strings (FIG. 1B). The switches in FIG. 1A can be referred to as string switches and include a switch on each side of the string. In FIG. 1B, the switches inside the battery packs can be referred to as pack switches. The switch on the positive side of a string can be referred to as a positive-side switch or an upstream switch (e.g., 104A in FIGS. 1A and 1B), while the switch on the negative side of the string can be referred to as a negative-side switch or a downstream switch (e.g., 104B in FIGS. 1A and 1B). The powered system also includes a discharge switch (e.g., 104C in FIGS. 1A and 1B) that opens to disconnect the strings from the load(s) of the powered system and closes to connect the strings to the load(s). The powered system includes a charge or charging switch (e.g., 104D in FIGS. 1A and 1B) that opens to disconnect the power source(s) from the strings and that closes to connect the power source(s) with the power sources. Alternatively, the discharge switch can be a contactor and referred to as a discharge contactor and the charging switch can be a contactor and referred to as a charging contactor. The powered system can include a precharging contactor 104E that is controlled by the controller to open or close to disconnect or connect a precharging resistor 118 with the bus.

A set of diodes 114 can be provided for each of the strings (FIG. 1A) or in one or more other locations (e.g., at the system level between each of the discharge and charge contactors or switches and the strings, as shown in FIG. 1B). With respect to the diodes provided at the system level in FIG. 1B, the circuit 106 also can include a charger switch and a charger connector conductively coupled with the bus in a location between the diodes and the strings. The charger connector can be coupled with a utility grid or other source of electric power by the charger switch. The charger switch can open or close to decouple or couple the charger connector (and the grid or other source of power) to the bus.

In the illustrated example of FIG. 1A, each set of diodes for each string includes one diode polarized toward the string and another diode polarized toward the load(s) and/or power source(s). For example, each set of diodes can include one diode having the anode of that diode coupled with the positive-side switch and the cathode of the same diode connected with a conductive bus 116 that couples the string and the diode to the load(s) and power source(s). Each set of diodes for each string can include another diode having the cathode of that diode coupled with the positive-side switch and the anode of the same diode connected with the bus that couples the string and the diode to the load(s) and power source(s).

The diodes may be used to prevent microcycling on the strings at or near zero current levels, which reduces internal heating of the cells and can increase the useful lives of the cells. The diodes can drive a need for the individual discharge and charging contactors to control conduction of energy (e.g., power) to and from the strings that are in parallel to each other. The discharge switch and/or charging switch can be at the system level or per string. In a disconnected state of the powered system, the charging and discharging switches are open to disconnect the strings from the load(s) and the power source(s). If a charge mode is desired (where one or more of the strings are charged with energy from the power source(s)), then the controller can close one or more of the string to discharge energy stored in the strings associated with the closed switches to precharge the conductive bus. The controller can precharge the bus prior to charging one or more of the strings and/or prior to discharging one or more of the strings to charge a zero-volt bus upward to meet the potential of the strings to prevent inrush current caused by connecting the strings.

In one example, the controller first closes the string switches (both positive-side and negative-side) for the string having the lowest voltage (or the smallest amount of stored energy) among the strings. In the example illustrated in FIG. 1A, the controller closes the string switches associated with the middle string while the charging and discharging contactors are open because the middle string has the smallest voltage or least amount of energy stored in the string (among the five strings shown in FIG. 1A). This state of the switches and contactors causes energy to be discharged by the middle string into the bus to precharge the bus (and increase the potential of the bus relative to a ground reference). Precharging of the bus may be complete when the potential of the bus (e.g., the voltage of the bus) is the same as the middle string or is within a designated difference. This designated difference can be a small acceptable difference between the bus potential and the string potential that is based on a voltage drop across a precharge resistor.

The controller can then close the charging contactor to connect the power source(s) with the bus. The controller can then close the string switches for the remaining strings (e.g., the two strings on the left side of the middle string and on the right side of the middle string) to connect these strings with the bus, as shown in the charging mode of FIG. 2. This connects the strings with the power source to charge the lowest voltage string using energy from the power source(s) once the voltage or potential of the precharged bus reaches or exceeds the voltage of the string used to precharge the bus (e.g., the lowest charged string, or the middle string). The remaining strings will charge once the bus voltage exceeds the voltage of that string in order to turn on the diode associated with that string. Closing the contactors and switches in this sequence can reduce inrush current, or the current input to the strings from the power source(s) once the string switches are closed and the strings are connected with the power source(s). The inrush current can be reduced relative to closing the switches in another sequence, such as by closing all string switches at the same time, closing the string switches for a higher charged string (higher than the lowest charged string) before closing the string switches for a lower or the lowest charged string, etc. Reducing the inrush current can reduce the wear and tear on the contactors, switches, and cells, and extend the useful lives of these components.

Optionally, precharging the bus using the lowest charged string can be avoided by charging the bus with another source of energy. For example, one or more of the power sources can be used to conduct energy (e.g., voltage or direct current) onto the bus (to precharge the bus). Prior to charging the strings with energy from the power sources, the controller can close the switches in a sequence that includes closing the string switches, precharging the bus with energy stored in the strings, and then closing the charging contactor or switch once the voltages in the strings are the same (or within a threshold difference). For example, the bus can be precharged until the difference between the bus potential and the string potentials divided by the internal resistance of the strings does not exceed 90 or 100% of the capacity of the strings. Precharging the bus using current from the power source(s) can reduce inrush current that otherwise could damage the switches, contactors, and/or strings.

Once the bus is precharged (with current from the lowest charged string and/or the power source(s)), the controller can close the string switches in a sequence to further reduce inrush current into the strings. In one example, the sequence can be based on the differences or proximities of the voltages of the strings relative to each other and/or the bus. The controller can examine the voltages (also referred to as states of charge) of the strings, compare these voltages to the bus and/or other strings that are already or currently connected to the bus (with the associated string switches closed), and close the string switches of the disconnected strings in a sequence based on this comparison. The controller can close the string switches for the strings having voltages within a close tolerance of the bus and/or the strings that are connected to the bus by closed string switches. For example, after the bus is precharged by the lowest charged string or the power source(s), the controller can select a disconnected string that has a voltage that is within a designated threshold of the voltage (e.g., potential) of the bus or the string that is already connected with the bus. This threshold may be 3%, 5%, 10%, 20%, or the like, in different examples. As another example, after the bus is precharged by the lowest charged string or the power source(s), the controller can select a disconnected string that has a voltage that is closer or closest the string that is already connected with the bus. The controller can close the string switches of the selected string to connect that string to the bus. This process can continue by closing the remaining strings for charging. This process can reduce inrush currents into the strings, which reduces wear and tear on the components, as described herein.

For example, the sequence of connecting the strings to the bus after the bus is precharged can be based on the states of charge of the strings or charge capacities of the strings. The states of charge of each of the strings can represent how much energy (e.g., voltage) is stored in the respective string. The charge capacities of each of the strings can represent how much energy (e.g., kWh) the respective string can receive for charging the string. Strings having greater states of charge have lower charge capacities (as these strings already are more charged) than other strings. Conversely, strings having smaller states of charge have greater charge capacities (as these strings are less charged) than other strings.

As another example, the string switches for all the strings may be open and the charging and discharge switches (or contactors) may be open. The controller can examine the voltages of the strings and determine that the string 108C has the lowest voltage, followed by the string 108A, then the string 108E, then the string 108D, and finally the string 108B such that the string 108B has the greatest state of charge of the strings, the string 108D has the second highest state of charge, the string 108E has the third highest state of charge, the string 108A has the fourth highest state of charge, and the string 108C has the lowest state of charge. The controller can close the string switches of the string 108C to precharge the bus with voltage from the string 108C or can close the charging switch (while the string switches remain open) to precharge the bus with voltage from the power source(s). After the potential of the bus is increased (or is increased by a threshold amount, such as 20%, 50%, or the like in different examples) during precharging of the load bus (e.g., the portion of the bus extending to the power sources and labeled as DC Link in the Figures), the controller can then close the discharging switch, the charging switch, and/or the negative side switch. The string switches can then be closed in an order that is based on the proximity of the string potential to the potential of the bus.

The controller can examine the states of charge of the strings, compare these states of charge to each other, and close the string switches of the disconnected strings in a sequence based on this comparison. The controller can close the string switches for the strings having the lowest states of charge before the strings having greater states of charge. For example, after the bus is precharged by the lowest charged string or the power source(s), the controller can select a disconnected string that has the lowest state of charge and then close the string switches for that string. The controller can then select another disconnected string having the lowest state of charge (of the remaining strings that are still disconnected from the bus) and close the string switches of that string. If a string diode is present, and only the charging contactor is closed, all string contactors can be closed at once as there will be little to no string-to-string inrush of current. If there are no diodes present, only the switches of the disconnected strings are closed as the voltage or state of charge between strings become equal as the strings are charged. This sequence can continue until all strings are connected to the bus. This process can reduce inrush currents into the strings, which reduces wear and tear on the components, as described herein.

As another example, the controller can examine the charging capacities of the strings, compare these charging capacities to each other, and close the string switches of the disconnected strings in a sequence based on this comparison. The controller can close the string switches for the strings having larger charging capacities before the strings having smaller charging capacities. For example, after the bus is precharged, the controller can select a disconnected string that has the greatest charging capacity and then close the string switches for that switch. If there are string diodes present and only the charging switch is closed, the controller can close all of the string switches at once as there will be little to no string-to-string inrush current. If there are no diodes present, then the controller may only close the disconnected strings as the voltage or storage capacity between the strings becomes equal as the strings are charged. This sequence can continue until all strings are connected to the bus. This process can reduce inrush currents into the strings, which reduces wear and tear on the components, as described herein.

As another example, the controller can connect the strings to the bus in a sequence that is based on depths-of-discharge of the strings. The controller can determine depths-of-discharge of the strings (e.g., the amount of voltage previously discharged from a string, or the differences between a fully charged string and the current state of charge of the string) and compare the depths-of-discharge of the strings to each other. The controller can connect the strings in an order such that the strings with the largest depths-of-discharge are connected to the bus before other strings having larger depths-of-discharge. For example, if there are string diodes present and only the charge switch is closed, the controller can close all string switches at once as there will be little to no string-to-string inrush current. If there are no diodes present, the controller may only close the switches of the disconnected strings as the voltage or depth of discharge between the strings become equal as the strings are charged This can reduce inrush currents to extend the useful lives of the strings.

As another example, the controller can connect or disconnect the strings to the bus in a sequence that is based on a load placed on the strings by the load(s) and on ratings of the switches. The string switches can be contactors or other types of switches that are associated with numerical ratings indicative of maximum switching voltages and/or maximum switching currents of the contactors. The controller can determine (from a memory, input from an operator, or the like) the ratings of the string switches and open the switches in a sequence based on the ratings. The controller can connect at least one of the strings that is not under any load and that has a lower rating than one or more other switches before closing a higher rated switch of the switches.

The controller also can control the switches to discharge energy from the strings (e.g., as direct current) to power the load(s). From a disconnected state where the string switches are open, the charging switch is open, and the discharging switch is open, the controller can close the string switches for one of the strings to precharge the bus. The controller can then close the discharge switch or contactor to connect the bus to the load(s). The controller can then close the string switches for the remaining strings to discharge the energies stored in the strings to power the load(s). Among these remaining strings, the controller can close the string switches in a sequence that closes the string switches for the string having the greatest voltage, the greatest state of charge, or the smallest charging capacity for precharging the bus. The controller can then close the string switches for the string having the next greatest voltage (of the strings not yet connected to the bus by associated string switches), the next greatest state of charge (of the strings not yet connected to the bus by associated string switches), the next smallest charging capacity (of the strings not yet connected to the bus by associated string switches), or the like. For example, the controller can close the string switches for the string that is selected based on current conditions of the bus and/or other connected strings (strings having switches that already are closed). The current conditions of the bus can include the difference in potentials between the disconnected strings and the potential of the bus. The controller can continue closing the string switches in this sequence until all strings are connected with the bus by the associated or respective string switches, as shown in FIG. 3 (the discharge or discharging state of the system).

As shown in the diodes shorted state of FIG. 4, the discharge and charge switches may both be concurrently closed while one or more of the strings remains disconnected from the bus. In the illustrated example, the string switches of only a single string are closed with the discharge and charge switches. The string switches of the remaining strings remain open. Alternatively, the string switches of more than one (but less than all) of the strings are closed with the discharge and charge switches being closed, while at least one of the strings has the associated string switches in an open state.

The system can be switched to the diodes shorted state of FIG. 4 to allow power (e.g., current) to be conducted into and/or out of the string(s) that have the closed string switches. This may be desirable when fluxing electric machines (e.g., the load(s)), plugging operation of the powered system (e.g., a vehicle such as a locomotive), or the like.

Optionally, the diodes can permit testing of a string without disconnecting the string switches of that string. The link voltage (e.g., voltage provided by the power source(s) to the bus) can be reduced by the controller. The controller can direct the power source(s) to reduce this voltage to a level that is less than the voltage of the string that remains connected with the bus. This can eliminate current from being conducted into or out of the strings and allow for one or more additional strings to be connected to the bus (e.g., by closing the string switches associated with strings such that the strings are connected to the bus one at a time) at no load to perform self-tests on the strings. The diodes also allow for a string to be disconnected periodically or momentarily for the controller to assess an open circuit state of the string (e.g., the controller can measure the open circuit voltage of the string).

The controller can disconnect the strings from the bus, such as when the strings are charged, the strings are discharged, or the powered system is deactivated or turned off. The controller can disconnect the strings from the bus in a sequence that reduces the inrush current into the strings to reduce the wear and tear on the strings and switches (reduces relative to disconnecting the strings in another sequence). This sequence can involve the controller reducing the power or current demanded from the strings. For example, the controller can deactivate or reduce operation of the load(s) (e.g., reducing motor speeds, deactivating or reducing operation of auxiliary systems of a vehicle, etc.). The controller can then open the charge and/or discharge switches, and then open the string switches to disconnect the strings from the bus. The diodes can help protect the strings by blocking conduction of current between or among the strings.

In another example, the powered system may not include the diodes disposed between (a) the positive-side string switches and (b) the load(s) and the power source(s). The controller can disconnect the strings from the bus in a sequence that protects the strings from the conduction of current from one or more strings into one or more other strings. For example, the controller can change states of the string switches in a sequence that reduces the number and/or amount of high current openings (where the current conducted out of or into one or more of the strings exceeds a designated threshold). To disconnect the strings from the bus when diodes are not present, the controller can reduce the power or current demanded from the strings. The controller can then open the charge and discharge switches of the powered system. The controller can then open the string switches in the sequence based on the magnitude and/or polarity of current conducted into or out of the strings. For example, the string switches of the string with the most current conducted into or out of the string can be opened by the controller first, then the string switches of the string with the most current conducted into or out of the string (of the remaining strings that are still connected with the bus) are opened, and so on, until the string switches are all opened. This can reduce the total number of large current openings.

As another example, the controller can open the string switches in a sequence that is based on the polarity of current conducted into or out of the strings and/or based on the direction that the contactors or switches are designed to conduct current. For example, a contactor or switch can be opened by the controller only when the current conducted into the contactor or switch is in the same direction that the contactor or switch is configured or designed to conduct current.

As another example, the controller can disconnect the strings in a sequence that is based on a rating of the string switches. This sequence can involve the controller opening the switches having higher ratings before opening the switches having lower ratings. For example, the controller can first open the switch having the highest rating, followed by the switch having the second highest rating, and so on.

Figure 5:
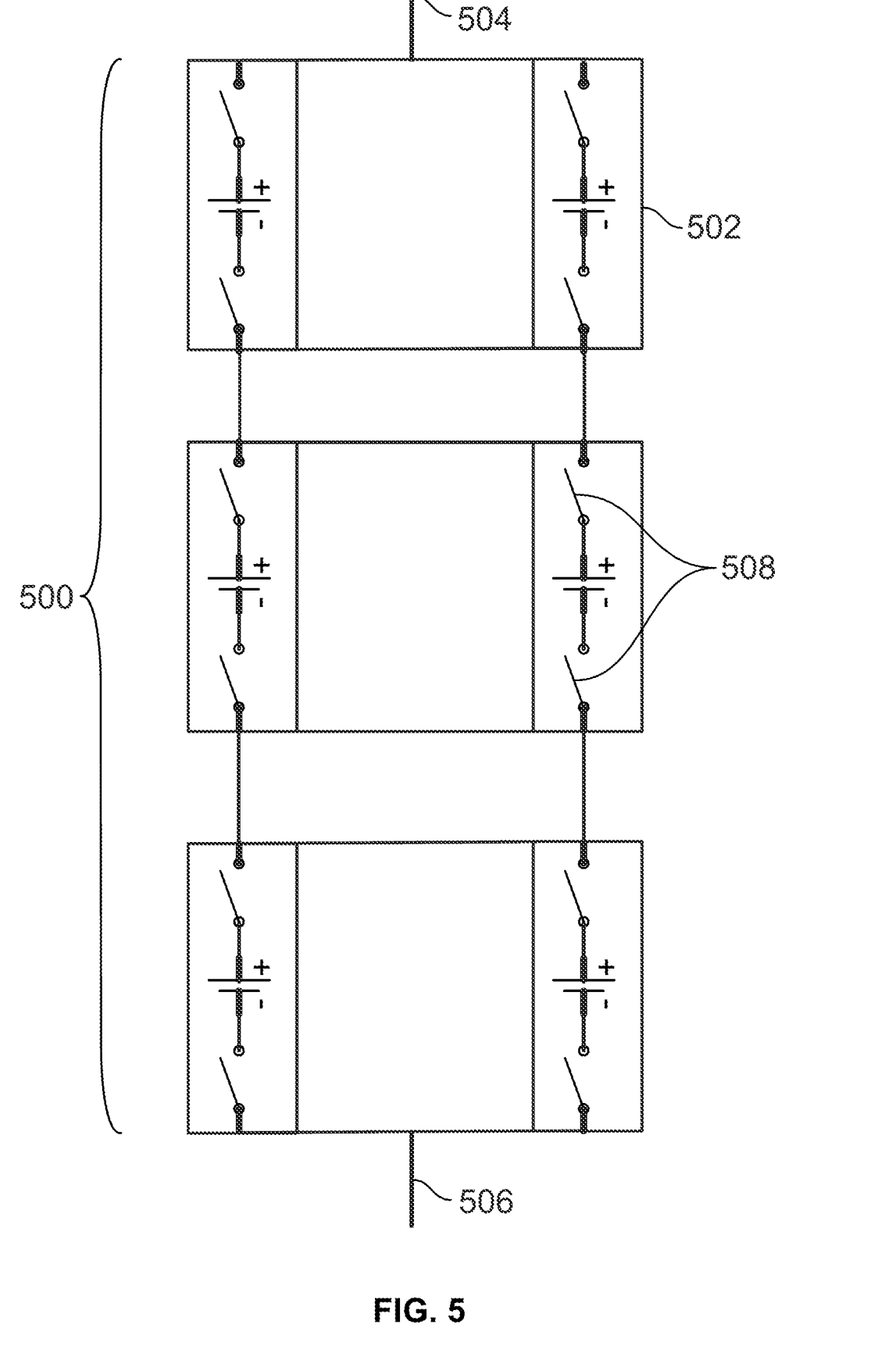
FIG. 5 illustrates one example of a set of packs connected in series and in parallel with each other.

The powered system shown in FIGS. 1 through 4 includes strings (e.g., substrings or battery packs) between the string switches. As described above, each string may represent two or more packs connected in parallel with each other. Alternatively, one or more of the strings in FIGS. 1 through 4 may be replaced with or can represent two or more packs connected in series and/or parallel with each other. FIG. 5 illustrates one example of a set 500 of packs 502 connected in series and in parallel with each other. The set of packs can be used in place of at least one of the strings shown in FIGS. 1 through 4, with a positive node 504 of the set coupled with the positive-side string switch and a negative node 506 of the set coupled with the negative-side string switch. As shown, each of the packs can include pack switches or contactors 508 that are controlled by the controller and that allow the controller to individually control which packs are connected or disconnected from the string switches and the bus. While six packs are shown in the set in FIG. 5, the set may have a greater or fewer number of the packs. The packs in the set may have different voltages and/or charging capacities to allow for control of the charging voltage levels based on the power source(s) and/or load(s) that are used to charge and be powered by the packs.

The controller optionally can connect strings to the bus and disconnect strings from the bus based on a demand of the load(s) of the powered system. In situations where full power from the strings is not required to power the load(s) of the powered system, the controller can change which strings are connected to the bus and which strings are not connected to the bus. For example, the controller can change how many strings are connected to the bus when the vehicle (e.g., the powered system) operates at different speeds. The controller can increase the number of strings connected to the bus while the vehicle operates at faster speeds and decrease the number of strings connected to the bus while the vehicle operates at slower speeds. This can reduce or prevent resonance in the powered system that is excited by drive switching frequency and drive input/output frequency. Each string has a separate inductance and, when different strings are connected or disconnected to the bus, the inductance and resonance point of the powered system changes.

Additionally, the controller can disconnect one or more strings to reduce microcycling of cells in low power operating scenarios of the powered system. For example, the controller can connect a single string to the bus and operate the string at increased power levels (relative to connecting more than the single string to the bus) to reduce microcycling of the single string. Reducing microcycling of the string(s) can reduce wear and tear on the string(s) and extend the useful life or lives of the strings.

The controller can disconnect one or more strings from the bus to allow for the disconnected string(s) to be replaced with one or more other strings. For example, during operation of the powered system where the strings 108A-D are supplying power to the load(s) and/or being charged by the power source(s), the controller can disconnect the string 108E from the bus to allow for the string 108E to be swapped out for another string.

The controller can temporarily change one or more of the load(s) or power source(s) connected to the bus before opening or closing one or more of the string switches to reduce inrush currents to the strings. The controller may control the load(s) to reduce how much power is demanded from the strings. This reduction in power demand may result in fewer strings supplying current through the diodes to the load(s). For example, a first load (e.g., a motor) may demand power from three of the strings 108A-C. The controller can deactivate the first load and activate a different, second load (e.g., a blower or fan). The second load may demand less power and, as a result, only two of the strings 108A, 108C supply power to the second load. The controller can open the string switches so that the string 108B, which is not supplying power to the second load, is disconnected from the bus.

Figure 6:
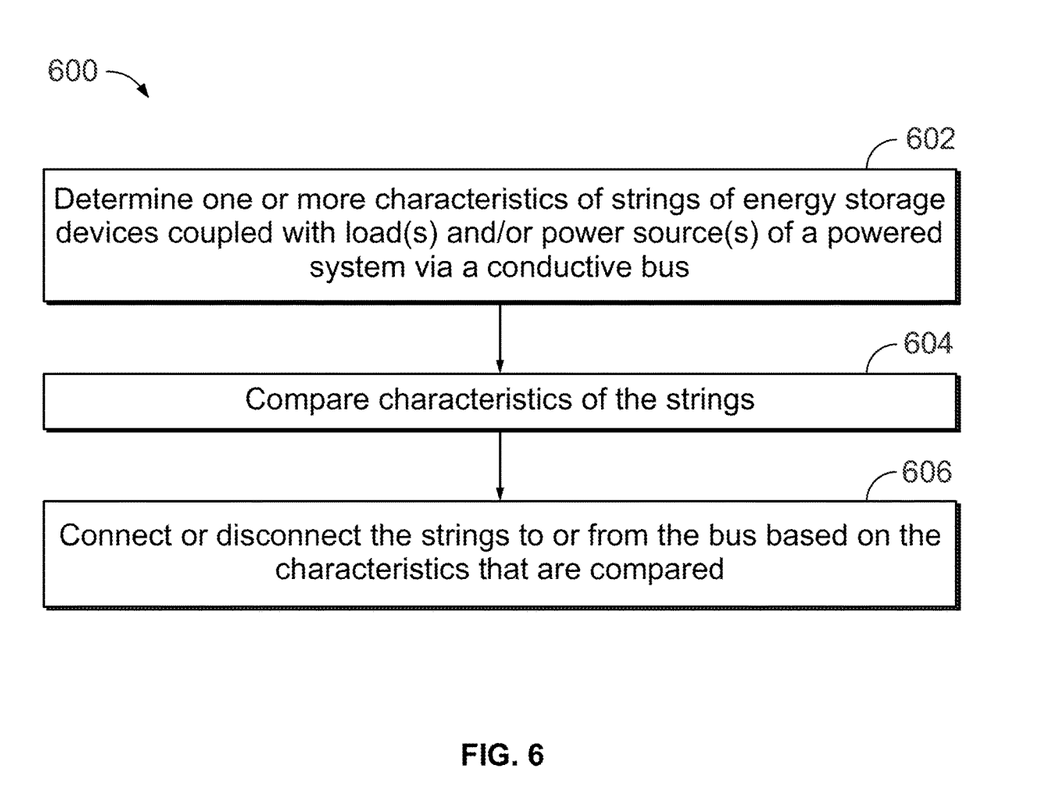
FIG. 6 illustrates a flowchart of one example of a method for controlling connection of strings of energy storage devices to load(s) and/or power source(s) of a powered system.

FIG. 6 illustrates a flowchart of one example of a method 600 for controlling connection of strings of energy storage devices to load(s) and/or power source(s) of a powered system. The method can represent operations performed by the control system and/or controller described herein. At 602, one or more characteristics of the strings are determined. These characteristics can include states of charges of strings of energy storage devices, charge capacities of the strings, electric currents conducted into or out of the strings, polarities of the electric currents, or the like. At 604, the characteristics of the strings are compared with each other. For example, the states of charge can be compared to determine which strings have greater or lower states of charge than other strings; the charge capacities can be compared to determine which strings have greater or lower charge capacities; and so on. With respect to polarities of the electric currents, the polarities can be compared to determine which strings are conducting current out of the string and which strings are receiving current.

At 606, the strings are connected or disconnected from a bus that couples the strings with load(s) and/or power source(s) of the powered system based on the characteristics of the strings that are compared. For example, the strings can be connected or disconnected from the bus in a sequence that is based on the characteristics, as described herein. The method may be repeated one or more additional times during operation of the powered system to connect or disconnect strings from the load(s) and/or power source(s) via the bus.

In one example, a system (e.g., a battery control system) includes plural strings of energy storage devices that may power a load and to be charged by a power source. The strings are selectively connectable to one or more conductive buses by plural electrically controllable switches. The system also includes a controller operatively connected to the switches and that may control the switches for one or more of (a) connecting the strings with one or more of the load or the power source via the one or more conductive buses in a first sequence or (b) disconnecting the strings from one or more of the load or the power source via the one or more conductive buses in a second sequence. The first sequence and the second sequence are based on one or more of states of charge between the strings, different charge capacities between the strings, different electric currents conducted through the strings, different polarities of the electric currents conducted through the strings, and/or a speed of a vehicle that is powered by the one or more loads.

In a disconnected state where the strings are disconnected from the power source by the switches being in an open state, the controller can close one or more of the switches in the first sequence for charging the strings, where the first sequence closes a first switch of the switches or a first pair of the switches to connect a lower charged string of the strings with the power source to precharge the one or more conductive buses before closing a second switch of the switches to connect the power source with the one or more conductive buses before closing one or more third switches of the switches to connect one or more higher charged strings of the strings with the power source via the one or more conductive buses. The first sequence can close the first pair of the switches before closing the second switch while states of charge or voltages of the strings coupled with the first pair of the switches are within a designated tolerance of each other. The one or more higher charged strings can include two or more of the higher charged strings. The controller may close the third switches connected with the two or more higher charged strings in the first sequence that connects the two or more higher charged strings to the one or more conductive buses in an order according to a difference between a potential of the one or more conductive buses that have been precharged and a potential of each of the two or more higher charged strings. The controller may close the switches in an ascending order of or voltages of the strings coupled with the switches. The controller may close the third switches connected with the two or more higher charged strings in the first sequence that connects the two or more higher charged strings to the one or more conductive buses in an ascending order according to a state-of-charge difference between the strings, a depth-of-discharge difference between the strings, states of charge of the strings, or depths of discharge of the strings.

The controller can precharge the one or more conductive buses with at least one of the higher charged strings. The controller can precharge the one or more conductive buses with the at least one of the higher charged strings prior to charging the strings. The controller can precharge the one or more conductive buses with the at least one of the higher charged strings prior to discharging the strings.

The controller can precharge the one or more conductive buses with a power source. The controller can precharge the one or more conductive buses with the power source prior to charging the strings. The controller can precharge the one or more conductive buses with the power source prior to discharging the strings.

In a disconnected state where the strings are disconnected from the power source by the switches being in an open state, the controller can close the switches in the first sequence by concurrently connecting the strings with the one or more conductive buses where the power source is available to precharge the one or more conductive buses.

The system optionally includes diodes disposed between (c) each of the strings and (d) the load and the power source, at least one of the diodes for each of the strings polarized toward the string and at least one other of the diodes for each of the strings polarized toward the load and the power source. The switches can include a discharging contactor may be closed to couple the load with the strings and a charging contactor may be closed to couple the power source with the strings. The controller can short the diodes together by concurrently closing both the discharging contactor and the charging contactor. The controller can open one or more of the switches that control conduction of current out of one or more of the strings that are not conducting current prior to shorting the diodes together, prior to charging the strings, and/or prior to discharging energy stored in the strings. The controller can close all of the switches to connect the strings with the one or more of the load or the power source via the one or more conductive buses regardless of voltages of the strings during charging or discharging of the strings.

The controller can disconnect the strings from one or more of the power source or the load in the second sequence by opening the switches in an order from a higher current of the electric currents conducted through the strings to a lower current of the electric currents conducted through the strings. The controller can control the switches to one or more of disconnect the strings or connect the strings to control an electrical characteristic of the one or more conductive buses. The controller can control the switches to one or more of disconnect the strings or connect the strings to control the electrical characteristic of the one or more conductive buses based on an operating point of an inverter.

The energy storage devices can be arranged in packs with each of the packs disposed between a pair of the switches. At least one of the packs can include the energy storage devices arranged in parallel to each other. At least one of the packs may be swapped out for one or more different packs. The switches can include two or more contactors, and the controller can open the contactors in a third sequence from a larger rated contactor to a lower rated contactor. The switches can include two or more contactors, and the controller can close one or more of the contactors to connect at least one of the strings that is not under any load before closing a higher rated contactor of the contactors to connect the strings to the load or the source. The controller can temporarily change one or more of the load or the source before closing or opening one or more of the switches.

In one example, a system (e.g., another battery control system) includes strings of energy storage devices that may power loads and to be charged by one or more power sources of a vehicle. The strings are selectively connectable to a conductive bus by plural electrically controllable switches. The system also includes a controller operatively connected to the switches and that may control the switches for one or more of connecting the strings to the bus or disconnecting the strings from the bus in a sequence that is based on one or more of states of charge between the strings, charge capacities of the strings, electric currents conducted into or out of the strings, polarities of the electric currents conducted into or out of the strings, or a speed of the vehicle.

In one example, a method includes determining one or more of states of charges of strings of energy storage devices, charge capacities of the strings, electric currents conducted into or out of the strings, or polarities of the electric currents; comparing the one or more of the states of charges, the charge capacities, the electric currents, or the polarities; and one or more of closing or opening switches between the strings and a conductive bus that couples the strings with a load and a power source of a powered system. The switches are one or more of closed or opened in a sequence based on the states of charges, the charge capacities, the electric currents, or the polarities that are compared.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the examples, including the best mode, and to enable a person of ordinary skill in the art to practice the examples, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   plural strings of energy storage devices configured to power a load and to be charged by a power source, the strings selectively connectable to one or more conductive buses by plural electrically controllable switches; and
   a controller operatively connected to the switches and configured to control the switches for one or more of (a) connecting the strings with one or more of the load or the power source via the one or more conductive buses in a first sequence or (b) disconnecting the strings from one or more of the load or the power source via the one or more conductive buses in a second sequence, the controller configured to precharge the one or more conductive buses with one or more of: (c) at least one higher charged string of the strings or (d) the power source, the first sequence and the second sequence based on one or more of states of charge between the strings, different charge capacities between the strings, different electric currents conducted through the strings, different polarities of the electric currents conducted through the strings, or a speed of a vehicle that is powered by the load.

2. The system of claim 1, wherein, in a disconnected state where the strings are disconnected from the power source by the switches being in an open state, the controller is configured to close one or more of the switches in the first sequence for charging the strings, wherein the first sequence closes a first switch of the switches or a first pair of the switches to connect a lower charged string of the strings with the power source to precharge the one or more conductive buses before closing a second switch of the switches to connect the power source with the one or more conductive buses before closing one or more third switches of the switches to connect one or more higher charged strings of the strings with the power source via the one or more conductive buses.

3. The system of claim 2, wherein the first sequence closes the first pair of the switches before closing the second switch while states of charge or voltages of the strings coupled with the first pair of the switches are within a designated tolerance of each other.

4. The system of claim 2, wherein the one or more higher charged strings includes two or more of the higher charged strings, and the controller is configured to close the third switches connected with the two or more higher charged strings in the first sequence that connects the two or more higher charged strings to the one or more conductive buses in an order according to a difference between a potential of the one or more conductive buses that have been precharged and a potential of each of the two or more higher charged strings.

5. The system of claim 2, wherein the controller is configured to close the switches in an ascending order of voltages of the strings coupled with the switches.

6. The system of claim 2, wherein the controller is configured to close the third switches connected with the two or more higher charged strings in the first sequence that connects the two or more higher charged strings to the one or more conductive buses in an ascending order according to a state-of-charge difference between the strings, a depth-of-discharge difference between the strings, states of charge of the strings, or depths of discharge of the strings.

7. The system of claim 1, wherein the controller is configured to precharge the one or more conductive buses with the at least one of the higher charged strings prior to charging the strings.

8. The system of claim 1, wherein the controller is configured to precharge the one or more conductive buses with the at least one of the higher charged strings prior to discharging the strings.

9. The system of claim 1, wherein the controller is configured to precharge the one or more conductive buses with the power source prior to charging the strings.

10. The system of claim 1, wherein the controller is configured to precharge the one or more conductive buses with the power source prior to discharging the strings.

11. The system of claim 1, wherein, in a disconnected state where the strings are disconnected from the power source by the switches being in an open state, the controller is configured to close the switches in the first sequence by concurrently connecting the strings with the one or more conductive buses where the power source is available to precharge the one or more conductive buses.

12. The system of claim 1, further comprising diodes disposed between (e) each of the strings and (f) Lathe load and the power source, at least one of the diodes for each of the strings polarized toward the string and at least one other of the diodes for each of the strings polarized toward the load and the power source.

13. The system of claim 12, wherein the switches include a discharging contactor configured to be closed to couple the load with the strings and a charging contactor configured to be closed to couple the power source with the strings, and the controller is configured to short the diodes together by concurrently closing both the discharging contactor and the charging contactor.

14. The system of claim 13, wherein the controller is configured to open one or more of the switches that control conduction of current out of one or more of the strings that are not conducting current prior to shorting the diodes together, prior to charging the strings, and/or prior to discharging energy stored in the strings.

15. The system of claim 12, wherein the controller is configured to close all of the switches to connect the strings with the one or more of the load or the power source via the one or more conductive buses regardless of voltages of the strings during charging or discharging of the strings.

16. The system of claim 1, wherein the controller is configured to disconnect the strings from one or more of the power source or the load in the second sequence by opening the switches in an order from a higher current of the electric currents conducted through the strings to a lower current of the electric currents conducted through the strings.

17. A system comprising:

plural strings of energy storage devices configured to power a load and to be charged by a power source, the strings selectively connectable to one or more conductive buses by plural electrically controllable switches; and a controller operatively connected to the switches and configured to control the switches for one or more of (a) connecting the strings with one or more of the load or the power source via the one or more conductive buses in a first sequence or (b) disconnecting the strings from one or more of the load or the power source via the one or more conductive buses in a second sequence, wherein the first sequence and the second sequence are based on one or more of states of charge between the strings, different charge capacities between the strings, different electric currents conducted through the strings, different polarities of the electric currents conducted through the strings, or a speed of a vehicle that is powered by the one or more loads, the controller configured to precharge the one or more conductive buses with one or more of: (c) the at least one of the higher charged strings or (d) the power source prior to charging or discharging the strings.

18. A system comprising:

plural strings of energy storage devices configured to power a load and to be charged by a power source, the strings selectively connectable to one or more conductive buses by plural electrically controllable switches;

a controller operatively connected to the switches and configured to control the switches for one or more of (a) connecting the strings with one or more of the load or the power source via the one or more conductive buses in a first sequence or (b) disconnecting the strings from one or more of the load or the power source via the one or more conductive buses in a second sequence, wherein the first sequence and the second sequence are based on one or more of states of charge between the strings, different charge capacities between the strings, different electric currents conducted through the strings, different polarities of the electric currents conducted through the strings, or a speed of a vehicle that is powered by the one or more loads; and diodes disposed between (c) each of the strings and (d) the load and the power source, at least one of the diodes for each of the strings polarized toward the string and at least one other of the diodes for each of the strings polarized toward the load and the power source.

* * * * *